United States Patent
Rofougaran et al.

(10) Patent No.: US 8,249,523 B2
(45) Date of Patent: Aug. 21, 2012

(54) METHOD AND SYSTEM FOR A MULTI-PORT DISTRIBUTED ANTENNA

(75) Inventors: Ahmadreza Rofougaran, Newport Coast, CA (US); Maryam Rofougaran, Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 715 days.

(21) Appl. No.: 12/367,892

(22) Filed: Feb. 9, 2009

(65) Prior Publication Data

US 2010/0202326 A1 Aug. 12, 2010

(51) Int. Cl.
*H04B 1/38* (2006.01)
(52) U.S. Cl. ........... 455/73; 455/78; 455/84; 370/280
(58) Field of Classification Search ............. 455/73, 455/78, 84; 370/280
See application file for complete search history.

(56) References Cited

U.S. PATENT DOCUMENTS

2005/0227631 A1* 10/2005 Robinett ................ 455/83
* cited by examiner

*Primary Examiner* — John Poos
(74) *Attorney, Agent, or Firm* — Farjami & Farjami LLP

(57) ABSTRACT

Methods and systems for a multi-port distributed antenna are disclosed and may include configuring one or more amplifiers to communicate signals via one or more ports on a distributed antenna. A characteristic impedance of the distributed antenna at each of the one or more ports may be configured by a location of the one or more ports on the distributed antenna. The amplifiers may be impedance matched to the distributed antenna by coupling each of the amplifiers to the ports based on the characteristic impedance. The amplifiers may include power amplifiers and/or low noise amplifiers. The signals may be time division duplexed. The signals communicated via the ports on the distributed antenna may include RF signals. The distributed antenna may be integrated on a chip with the amplifiers or may be located external to a chip with the amplifiers. The distributed antenna may include a microstrip antenna.

20 Claims, 4 Drawing Sheets

METHOD AND SYSTEM FOR A MULTI-PORT DISTRIBUTED ANTENNA

CROSS-REFERENCE TO RELATED APPLICATIONS/INCORPORATION BY REFERENCE

This application makes reference to:
U.S. patent application Ser. No. 12/396,935 filed on Mar. 3, 2009;
U.S. patent application Ser. No. 12/396,964 filed on Mar. 3, 2009;
U.S. patent application Ser. No. 12/397,005 filed on Mar. 3, 2009; and
U.S. patent application Ser. No. 12/397,024 filed on Mar. 3, 2009.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for a multi-port distributed antenna.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

As the number of electronic devices enabled for wireline and/or mobile communications continues to increase, significant efforts exist with regard to making such devices more power efficient. For example, a large percentage of communications devices are mobile wireless devices and thus often operate on battery power. Additionally, transmit and/or receive circuitry within such mobile wireless devices often account for a significant portion of the power consumed within these devices. Moreover, in some conventional communication systems, transmitters and/or receivers are often power inefficient in comparison to other blocks of the portable communication devices. Accordingly, these transmitters and/or receivers have a significant impact on battery life for these mobile wireless devices.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a multi-port distributed antenna, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a multi-port distributed antenna. Exemplary aspects of the invention may comprise configuring one or more amplifiers to communicate signals via one or more ports on a distributed antenna. A characteristic impedance of the distributed antenna at each of the one or more ports may be configured by a location of the one or more ports on the distributed antenna. The amplifiers may be impedance matched to the distributed antenna by coupling each of the amplifiers to the ports based on the characteristic impedance. The amplifiers may comprise one or more power amplifiers and/or low noise amplifiers. The signals communicated via the ports on the distributed antenna may be time division duplexed. The signals may comprise RF signals. The distributed antenna may be integrated on a chip with the amplifiers or may be located external to a chip with the amplifiers. The distributed antenna may comprise a microstrip antenna.

Figure 1:
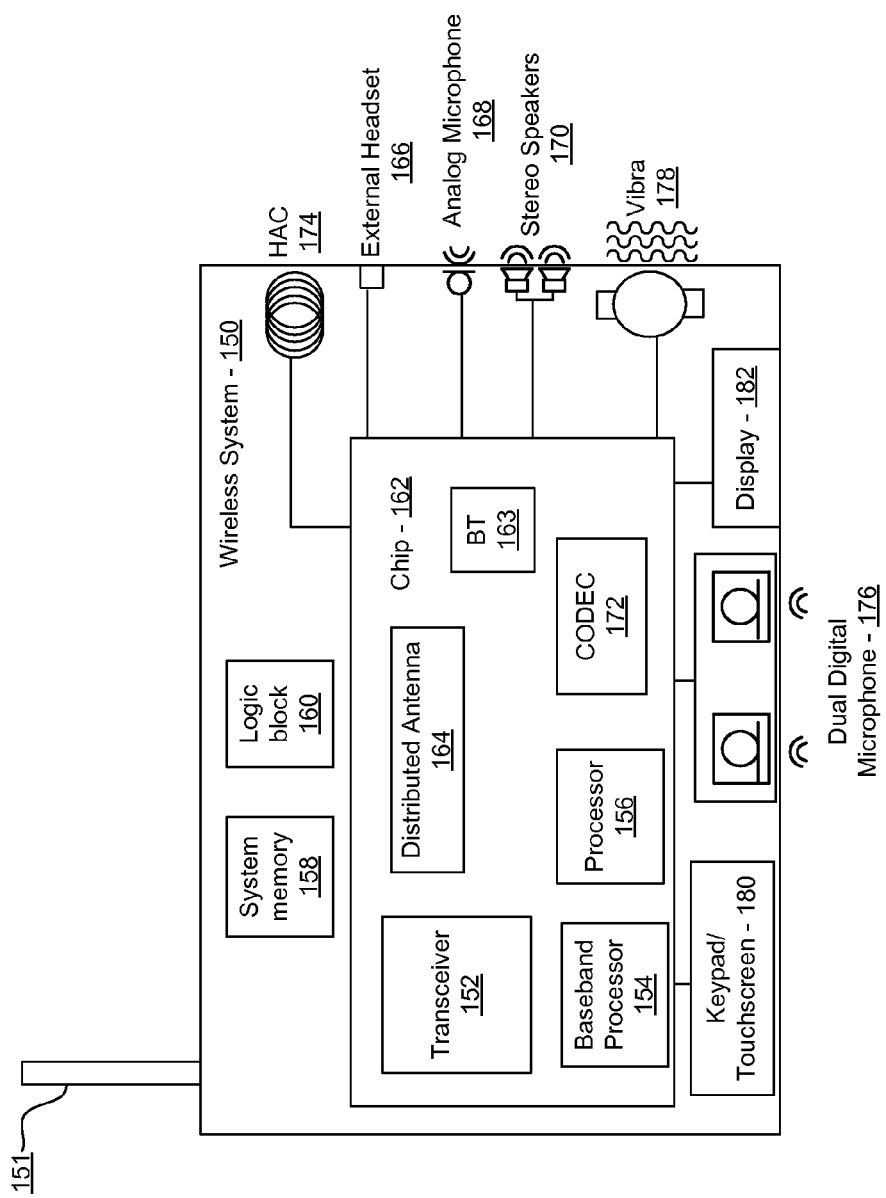
FIG. 1 is a block diagram of an exemplary wireless system, which may be utilized in accordance with an embodiment of the invention.

FIG. 1 is a block diagram of an exemplary wireless system, which may be utilized in accordance with an embodiment of the invention. Referring to FIG. 1, the wireless system 150 may comprise an antenna 151, a transceiver 152, a baseband processor 154, a processor 156, a system memory 158, a logic block 160, a chip 162, a distributed antenna 164, and an external headset port 166. The wireless system 150 may also comprise an analog microphone 168, integrated hands-free (IHF) stereo speakers 170, a hearing aid compatible (HAC) coil 174, a dual digital microphone 176, a vibration transducer 178, a keypad and/or touchscreen 180, and a display 182.

The transceiver 152 may comprise suitable logic, circuitry, and/or code that may be enabled to modulate and upconvert baseband signals to RF signals for transmission by one or more antennas, which may be represented generically by the antenna 151. The transceiver 152 may also be enabled to downconvert and demodulate received RF signals to baseband signals. The RF signals may be received by one or more antennas, which may be represented generically by the antenna 151, or the distributed antenna 164. Different wireless systems may use different antennas for transmission and reception. The transceiver 152 may be enabled to execute other functions, for example, filtering the baseband and/or RF signals, and/or amplifying the baseband and/or RF signals. Although a single transceiver 152 is shown, the invention is not so limited. Accordingly, the transceiver 152 may be implemented as a separate transmitter and a separate receiver. In addition, there may be a plurality of transceivers, transmitters and/or receivers. In this regard, the plurality of transceivers, transmitters and/or receivers may enable the wireless system 150 to handle a plurality of wireless protocols and/or standards including cellular, WLAN and PAN. Wireless technologies handled by the wireless system 150 may comprise GSM, CDMA, CDMA2000, WCDMA, GMS, GPRS, EDGE, WIMAX, WLAN, 3GPP, UMTS, BLUETOOTH, and ZIGBEE, for example.

The baseband processor 154 may comprise suitable logic, circuitry, and/or code that may be enabled to process baseband signals for transmission via the transceiver 152 and/or the baseband signals received from the transceiver 152. The processor 156 may be any suitable processor or controller such as a CPU, DSP, ARM, or any type of integrated circuit processor. The processor 156 may comprise suitable logic, circuitry, and/or code that may be enabled to control the operations of the transceiver 152 and/or the baseband processor 154. For example, the processor 156 may be utilized to update and/or modify programmable parameters and/or values in a plurality of components, devices, and/or processing elements in the transceiver 152 and/or the baseband processor 154. At least a portion of the programmable parameters may be stored in the system memory 158.

Control and/or data information, which may comprise the programmable parameters, may be transferred from other portions of the wireless system 150, not shown in FIG. 1, to the processor 156. Similarly, the processor 156 may be enabled to transfer control and/or data information, which may include the programmable parameters, to other portions of the wireless system 150, not shown in FIG. 1, which may be part of the wireless system 150.

The processor 156 may utilize the received control and/or data information, which may comprise the programmable parameters, to determine an operating mode of the transceiver 152. For example, the processor 156 may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the system memory 158 via the processor 156, for example. The information stored in system memory 158 may be transferred to the transceiver 152 from the system memory 158 via the processor 156.

The system memory 158 may comprise suitable logic, circuitry, and/or code that may be enabled to store a plurality of control and/or data information, including parameters needed to calculate frequencies and/or gain, and/or the frequency value and/or gain value. The system memory 158 may store at least a portion of the programmable parameters that may be manipulated by the processor 156.

The logic block 160 may comprise suitable logic, circuitry, and/or code that may enable controlling of various functionalities of the wireless system 150. For example, the logic block 160 may comprise one or more state machines that may generate signals to control the transceiver 152 and/or the baseband processor 154. The logic block 160 may also comprise registers that may hold data for controlling, for example, the transceiver 152 and/or the baseband processor 154. The logic block 160 may also generate and/or store status information that may be read by, for example, the processor 156. Amplifier gains and/or filtering characteristics, for example, may be controlled by the logic block 160.

The BT radio/processor 163 may comprise suitable circuitry, logic, and/or code that may enable transmission and reception of Bluetooth signals. The BT radio/processor 163 may enable processing and/or handling of BT baseband signals. In this regard, the BT radio/processor 163 may process or handle BT signals received and/or BT signals transmitted via a wireless communication medium. The BT radio/processor 163 may also provide control and/or feedback information to/from the baseband processor 154 and/or the processor 156, based on information from the processed BT signals. The BT radio/processor 163 may communicate information and/or data from the processed BT signals to the processor 156 and/or to the system memory 158. Moreover, the BT radio/processor 163 may receive information from the processor 156 and/or the system memory 158, which may be processed and transmitted via the wireless communication medium a Bluetooth headset, for example The CODEC 172 may comprise suitable circuitry, logic, and/or code that may process audio signals received from and/or communicated to input/output devices. The input devices may be within or communicatively coupled to the wireless device 150, and may comprise the analog microphone 168, the stereo speakers 170, the hearing aid compatible (HAC) coil 174, the dual digital microphone 176, and the vibration transducer 178, for example. The CODEC 172 may be operable to up-convert and/or down-convert signal frequencies to desired frequencies for processing and/or transmission via an output device. The CODEC 172 may enable utilizing a plurality of digital audio inputs, such as 16 or 18-bit inputs, for example. The CODEC 172 may also enable utilizing a plurality of data sampling rate inputs. For example, the CODEC 172 may accept digital audio signals at sampling rates such as 8 kHz, 11.025 kHz, 12 kHz, 16 kHz, 22.05 kHz, 24 kHz, 32 kHz, 44.1 kHz, and/or 48 kHz. The CODEC 172 may also support mixing of a plurality of audio sources. For example, the CODEC 172 may support audio sources such as general audio, polyphonic ringer, $I^2S$ FM audio, vibration driving signals, and voice. In this regard, the general audio and polyphonic ringer sources may support the plurality of sampling rates that the audio CODEC 172 is enabled to accept, while the voice source may support a portion of the plurality of sampling rates, such as 8 kHz and 16 kHz, for example.

The CODEC 172 may utilize a programmable infinite impulse response (IIR) filter and/or a programmable finite impulse response (FIR) filter for at least a portion of the audio sources to compensate for passband amplitude and phase fluctuation for different output devices. In this regard, filter coefficients may be configured or programmed dynamically based on current operations. Moreover, the filter coefficients may be switched in one-shot or may be switched sequentially, for example. The CODEC 172 may also utilize a modulator, such as a Delta-Sigma ($\Delta$-$\Sigma$) modulator, for example, to code digital output signals for analog processing.

The chip 162 may comprise an integrated circuit with multiple functional blocks integrated within, such as the transceiver 152, the processor 156, the baseband processor 154, the BT radio/processor 163, the CODEC 172, and the distributed antenna 164. The number of functional blocks integrated in the chip 162 is not limited to the number shown in FIG. 1. Accordingly, any number of blocks may be integrated on the chip 162 depending on chip space and wireless system 150 requirements, for example.

The distributed antenna 164 may comprise a plurality of ports for coupling signals in and/or out of the distributed antenna 164, and may be integrated in and/or on the chip 162. The physical dimensions of the distributed antenna 164 may be configured to optimize a frequency of operation and/or characteristic impedance at the plurality of ports.

The external headset port 166 may comprise a physical connection for an external headset to be communicatively coupled to the wireless system 150. The analog microphone 168 may comprise suitable circuitry, logic, and/or code that may detect sound waves and convert them to electrical signals via a piezoelectric effect, for example. The electrical signals generated by the analog microphone 168 may comprise analog signals that may require analog to digital conversion before processing.

The stereo speakers 170 may comprise a pair of speakers that may be operable to generate audio signals from electrical signals received from the CODEC 172. The HAC coil 174 may comprise suitable circuitry, logic, and/or code that may enable communication between the wireless device 150 and a T-coil in a hearing aid, for example. In this manner, electrical audio signals may be communicated to a user that utilizes a hearing aid, without the need for generating sound signals via a speaker, such as the stereo speakers 170, and converting the generated sound signals back to electrical signals in a hearing aid, and subsequently back into amplified sound signals in the user's ear, for example.

The dual digital microphone 176 may comprise suitable circuitry, logic, and/or code that may be operable to detect sound waves and convert them to electrical signals. The electrical signals generated by the dual digital microphone 176 may comprise digital signals, and thus may not require analog to digital conversion prior to digital processing in the CODEC 172. The dual digital microphone 176 may enable beamforming capabilities, for example.

The vibration transducer 178 may comprise suitable circuitry, logic, and/or code that may enable notification of an incoming call, alerts and/or message to the wireless device 150 without the use of sound. The vibration transducer may generate vibrations that may be in synch with, for example, audio signals such as speech or music.

In operation, control and/or data information, which may comprise the programmable parameters, may be transferred from other portions of the wireless system 150, not shown in FIG. 1, to the processor 156. Similarly, the processor 156 may be enabled to transfer control and/or data information, which may include the programmable parameters, to other portions of the wireless system 150, not shown in FIG. 1, which may be part of the wireless system 150.

The processor 156 may utilize the received control and/or data information, which may comprise the programmable parameters, to determine an operating mode of the transceiver 152. For example, the processor 156 may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the system memory 158 via the processor 156, for example. The information stored in system memory 158 may be transferred to the transceiver 152 from the system memory 158 via the processor 156.

The CODEC 172 in the wireless system 150 may communicate with the processor 156 in order to transfer audio data and control signals. Control registers for the CODEC 172 may reside within the processor 156. The processor 156 may exchange audio signals and control information via the system memory 158. The CODEC 172 may up-convert and/or down-convert the frequencies of multiple audio sources for processing at a desired sampling rate.

The wireless signals may be transmitted and received by the distributed antenna 164 which may comprise a plurality of input/output ports. The characteristic impedance seen by a device coupled to a particular port may be configured by the physical dimensions and by which of the plurality of ports the device may be coupled to, for example. It may be advantageous to couple power amplifiers to low impedance ports and low noise amplifiers (LNAs) to high impedance ports, for example. In this manner, amplifiers may be coupled to specific ports that may provide an appropriate impedance for optimum performance.

Figure 2:
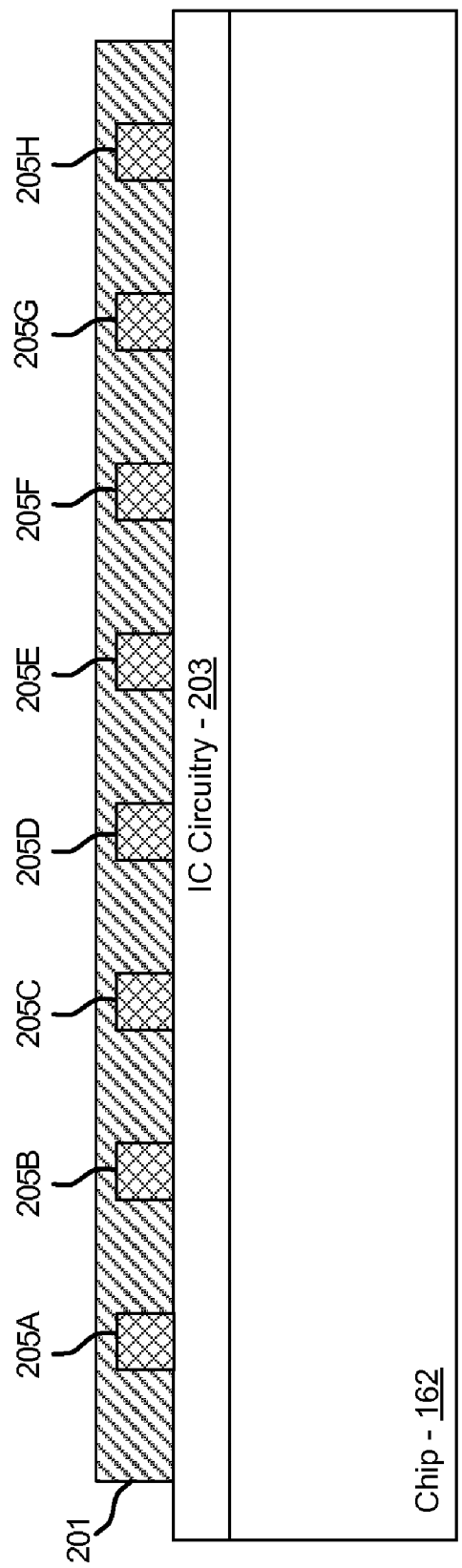
FIG. 2 is a block diagram illustrating an exemplary multi-port distributed antenna on a chip, in accordance with an embodiment of the invention.

FIG. 2 is a block diagram illustrating an exemplary multi-port distributed antenna on a chip, in accordance with an embodiment of the invention. Referring to FIG. 2, there is shown the chip 162, a distributed antenna 201, IC circuitry 203, and antenna ports 205A-205H. The chip 162 may be as described with respect to FIG. 1. The IC circuitry 203 may comprise devices integrated in the chip 162, such as the transceiver 152, the processor 156, and the baseband processor 154, for example.

The distributed antenna 201, which may be substantially similar to the distributed antenna 164 described with respect to FIG. 1, may comprise an antenna integrated in and/or on the chip 162 that may comprise a plurality of ports, the antenna ports 205A-205H, such that driver and receiver circuitry may be coupled to appropriate points along the distributed antenna 201. For example, LNAs may be coupled to ports that exhibit high characteristic impedance, and PAs may be coupled to ports that exhibit low characteristic impedance. The distributed antenna 201 may comprise a microstrip or coplanar waveguide, for example.

The antenna ports 205A-205H may comprise electrical contacts along the length of the distributed antenna 201 that may enable coupling to the antenna at a plurality of points. In this manner, devices may be coupled to the distributed antenna 201 where the characteristic impedance may be matched to the desirable impedance for the device to be coupled. The antenna ports 205A-205H may comprise metal strips, for example, that may be electrically coupled to the distributed antenna 201.

In operation, the PAs and the LNAs may be coupled to the antenna ports 205A-205H to match a desired impedance to the characteristic impedance of the particular antenna port 205A-205H. A low output impedance PA may be coupled to an antenna port that exhibits low characteristic impedance and a high input LNA may be coupled to a high characteristic impedance antenna port. In this manner, transmitted output power and received input power may be maximized.

Figure 3:
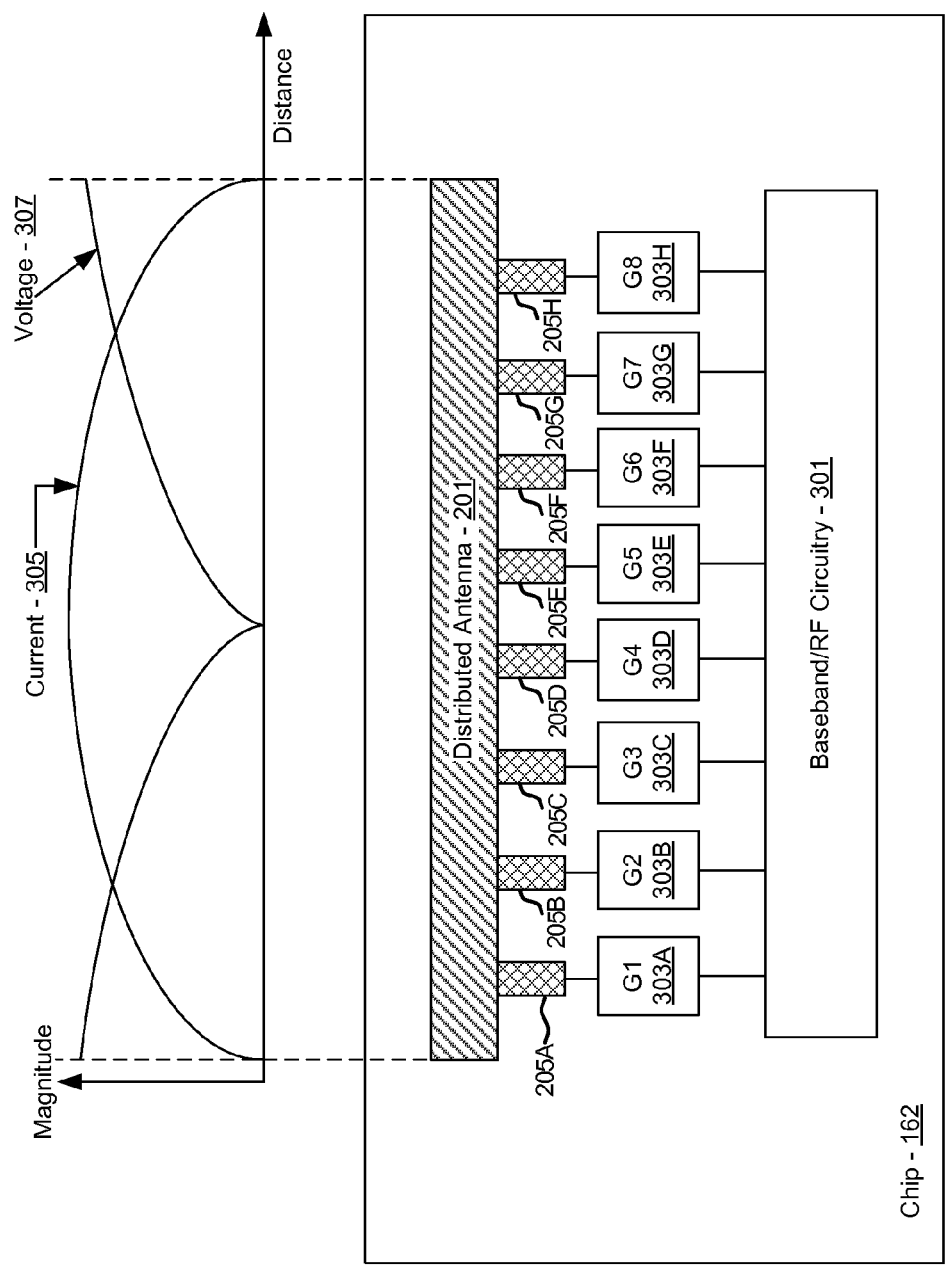
FIG. 3 is a block diagram illustrating a plan view of an exemplary multi-port distributed antenna on a chip, in accordance with an embodiment of the invention.

FIG. 3 is a block diagram illustrating a plan view of an exemplary multi-port distributed antenna on a chip, in accordance with an embodiment of the invention. Referring to FIG. 3, there is shown the chip 162, the distributed antenna 201, the antenna ports 205A-205H, baseband/RF circuitry 301, and amplifiers 303A-303H.

The baseband/RF circuitry 301 may comprise suitable, circuitry, logic and/or code that may be operable to process baseband and RF signals. The baseband/RF circuitry 301 may comprise the transceiver 152, the baseband processor 154, the processor 156, the CODEC 172, and the BT radio/processor 163, for example, described with respect to FIG. 1. Accordingly, the baseband/RF circuitry 301 may generate signals to be communicated to one or more of the amplifiers 303A-303H, and may receive signals generated by one or more of the amplifiers 303A-303H.

The amplifiers 303A-303H may comprise suitable, circuitry, logic and/or code that may be operable to amplify received signals, and may comprise power amplifiers (PAs) and/or low noise amplifiers (LNAs) that may be operable to communicate signals to and from the wireless medium via the distributed antenna 201. The amplifiers 303A-303H may comprise switches, such as CMOS transistors, for example, that may enable coupling and decoupling of an amplifier to an antenna port. Accordingly, the amplifiers 303A-303H may be switched to one or more of the antenna ports 205A-205H.

The current versus distance plot 305 may represent the magnitude of current across the length of the distributed antenna 201. Similarly, the voltage versus distance plot 307 may represent the magnitude of voltage across the length of the distributed antenna 201. The current and voltage at a given point on a distributed antenna may be dependant on the frequency of signals to be transmitted and/or received, the conductivity of the metal and the dielectric constant between the antenna and a ground plane, and by the physical dimensions of the antenna. Accordingly, by providing a plurality of antenna ports 205A-205H along the length of the distributed antenna 201, a plurality of characteristic impedances may be available for matching to the amplifiers 303A-303H.

The number of antenna ports 205A-105H is not limited to the number shown in FIGS. 2 and 3. Accordingly, any number of ports and amplifiers may be utilized depending on the desired number of characteristic impedances and range of amplifier gain.

In operation, RF signals may be generated by the baseband/RF circuitry 301. For a PA that may transmit maximum power with a low impedance antenna, the antenna port 205D may be utilized, where a high current/low voltage point along the distributed antenna 201 may be located. Similarly, the distributed antenna may be configured to receive RF signals and may communicate the received signals to an LNA, the amplifier 303A, for example, which may generate a maximum signal from a high impedance antenna, via the antenna port 205A, which may represent a high impedance port as indicated by the high voltage and low current for the current versus distance plot 305 and the voltage versus distance plot 307.

A plurality of antenna ports along the distributed antenna 201 may enable impedance matching of the amplifiers 303A-303H to respective portions of the distributed antenna 201, such that high impedance devices/circuits may be coupled to high impedance ports of the antenna ports 205A-205H, and low impedance devices/circuits may be coupled to low impedance ports of the antenna ports 205A-205H. In this manner, impedance matching may be enabled without adding extra impedance matching circuitry, which may utilize excessive space or components. The baseband/RF circuitry 301 may be enabled to operate in time division duplex (TDD) mode so that the distributed antenna 201 may be utilized for both transmission and reception of RF signals.

Figure 4:
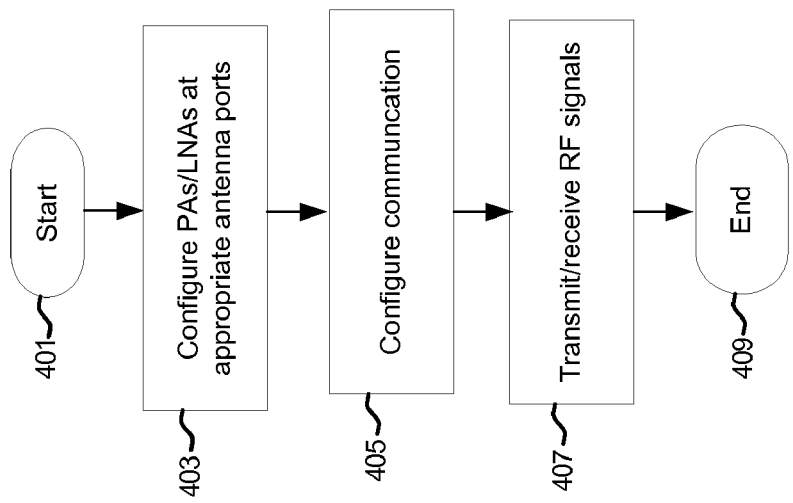
FIG. 4 is a block diagram illustrating exemplary steps for implementing a multiport distributed antenna, in accordance with an embodiment of the invention.

FIG. 4 is a block diagram illustrating exemplary steps for implementing a multiport distributed antenna, in accordance with an embodiment of the invention. Referring to FIG. 4, in step 403 after start step 401, the amplifiers 303A-303H may be enabled to transmit and/or receive signals to and/or from the distributed antenna 201 via the antenna ports 205A-205H according to the characteristic impedance along the distributed antenna 201. In step 405, RF communication may be configured via configuring the amplifiers 303A-303H at appropriate gain levels. In step 407, RF signals may be communicated to and from the distributed antenna 201 in TDD mode via the antenna ports 205A-205H and the amplifiers 303A-303H, where transmitted signals may be generated by the baseband/RF circuitry 301 and received signals may be received from the wireless medium, followed by end step 409.

In an embodiment of the invention, a method and system are disclosed for configuring one or more amplifiers 303A-303H to communicate signals via one or more ports 205A-205H on a distributed antenna 201. A characteristic impedance of the distributed antenna 201 at each of the one or more ports 205A-205H may be configured by a location of the one or more ports 205A-205H on the distributed antenna 201. The amplifiers 303A-303H may be impedance matched to the distributed antenna 201 by coupling each of the amplifiers 303A-303H to the ports 205A-205H based on the characteristic impedance. The amplifiers 303A-303H may comprise one or more power amplifiers and/or low noise amplifiers. The signals may be time division duplexed. The signals communicated via the ports 205A-205H on the distributed antenna 201 may comprise RF signals. The distributed antenna 201 may be integrated on a chip 162 with the amplifiers 303A-303H or may be located external to a chip 162 with the amplifiers 303A-303H. The distributed antenna 201 may comprise a microstrip antenna.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a multi-port distributed antenna.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for enabling communication, the method comprising:
configuring one or more amplifiers to communicate signals via one or more ports on a distributed antenna, wherein said distributed antenna comprises a microstrip antenna and a characteristic impedance of said distributed antenna at each of said one or more ports is configured based on where said one or more ports is located on said distributed antenna.

2. The method according to claim 1, comprising impedance matching each of said one or more amplifiers to said distributed antenna by coupling each of said one or more amplifiers to said one or more ports based on said characteristic impedance.

3. The method according to claim 1, wherein said amplifiers comprise one or more power amplifiers.

4. The method according to claim 1, wherein said amplifiers comprise one or more low noise amplifiers.

5. The method according to claim 1, comprising time division duplexing said communicated signals.

6. The method according to claim 1, wherein said signals comprise RF signals.

7. The method according to claim 1, wherein said distributed antenna is integrated on a chip with said amplifiers.

8. The method according to claim 1, wherein said distributed antenna is located external to a chip with said amplifiers.

9. The method according to claim 1, wherein said configured one or more amplifiers enables transmission and/or reception of said signals.

10. A system for enabling communication, the system comprising:
one or more circuits comprising one or more amplifiers, wherein:
said one or more circuits are operable to communicate signals via one or more ports on a distributed antenna, wherein said distributed antenna comprises a microstrip antenna; and
said one or more circuits are operable to configure a characteristic impedance of said distributed antenna at each of said one or more ports based on where said one or more ports is located on said distributed antenna.

11. The system according to claim 10, wherein said one or more circuits are operable to impedance match each of said one or more amplifiers to said distributed antenna by coupling each of said one or more amplifiers to said one or more ports based on said characteristic impedance.

12. The system according to claim 10, wherein said amplifiers comprise one or more power amplifiers.

13. The system according to claim 10, wherein said amplifiers comprise one or more low noise amplifiers.

14. The system according to claim 10, wherein said one or more circuits are operable to time division duplex said communicated signals.

15. The system according to claim 10, wherein said signals comprise RF signals.

16. The system according to claim 10, wherein said distributed antenna is integrated on a chip with said amplifiers.

17. The system according to claim 10, wherein said distributed antenna is located external to a chip with said amplifiers.

18. The system according to claim 10, wherein said one or more circuits are operable to configure said one or more amplifiers to transmit and/or receive said signals.

19. A communication system comprising:
a microstrip antenna comprising one or more ports;
an amplifier coupled to the one or more ports; and
a circuit operable to configure a characteristic impedance of the microstrip antenna at each of the one or more ports based on where the one or more ports are located on the microstrip antenna.

20. The communication system according to claim 19, wherein the circuit is operable to impedance match the amplifier to the microstrip antenna by coupling the amplifier to the one or more ports based on the characteristic impedance.

* * * * *